(12) United States Patent
Samocha et al.

(10) Patent No.: US 10,157,436 B2
(45) Date of Patent: Dec. 18, 2018

(54) SYSTEM FOR NAVIGATING VEHICLES ASSOCIATED WITH A DELIVERY SERVICE

(71) Applicant: GT Gettaxi Limited, Limassol (CY)

(72) Inventors: Ofer Samocha, Rishion Le-Zion (IL); Igor Magazinik, Ramat Gan (IL); Sunny Marueli, Nes Ziona (IL)

(73) Assignee: GT Gettaxi Limited, Limassol (CY)

( * ) Notice: Subject to any disclaimer, the term of this patent is extended or adjusted under 35 U.S.C. 154(b) by 20 days.

(21) Appl. No.: 14/880,021

(22) Filed: Oct. 9, 2015

(65) Prior Publication Data

US 2017/0102243 A1   Apr. 13, 2017

(51) Int. Cl.
*G01C 21/34*    (2006.01)
*G06Q 50/30*    (2012.01)
*G06Q 10/08*    (2012.01)

(52) U.S. Cl.
CPC ......... *G06Q 50/30* (2013.01); *G01C 21/3415* (2013.01); *G06Q 10/083* (2013.01)

(58) Field of Classification Search
CPC ............................ G01C 21/3453; G06Q 50/30
See application file for complete search history.

(56) References Cited

U.S. PATENT DOCUMENTS

| | | | |
|---|---|---|---|
| 2009/0210262 A1 | 8/2009 | Rines et al. | |
| 2010/0268450 A1 | 10/2010 | Evanitsky | |
| 2014/0207375 A1 | 7/2014 | Lerenc | |
| 2014/0279654 A1 | 9/2014 | Lievens et al. | |
| 2015/0046080 A1* | 2/2015 | Wesselius | G08G 1/202 |
| | | | 701/428 |
| 2015/0154810 A1 | 6/2015 | Tew et al. | |
| 2015/0161554 A1 | 6/2015 | Sweeney et al. | |
| 2015/0339928 A1* | 11/2015 | Ramanujam | G06Q 10/00 |
| | | | 701/23 |
| 2015/0379437 A1* | 12/2015 | Reich | G06Q 10/02 |
| | | | 705/5 |
| 2016/0026936 A1 | 1/2016 | Richardson et al. | |
| 2016/0034845 A1 | 2/2016 | Hiyama et al. | |
| 2016/0117610 A1* | 4/2016 | Ikeda | G06Q 50/32 |
| | | | 705/5 |
| 2016/0148164 A1 | 5/2016 | Luk et al. | |
| 2016/0321566 A1* | 11/2016 | Liu | G06Q 10/02 |
| 2017/0191842 A1 | 7/2017 | Magazinik et al. | |
| 2018/0101878 A1 | 4/2018 | Marueli et al. | |

OTHER PUBLICATIONS

European Search Report for European Patent Application No. EP 17195935.6, dated Dec. 11, 2011, 9 pages.
Non-final Office Action for U.S. Appl. No. 14/985,565, dated Aug. 29, 2017.
Final Office Action for U.S. Appl. No. 14/985,565, dated Feb. 21, 2018.
Non-final Office Action for U.S. Appl. No. 14/985,565, dated May 29, 2018.

* cited by examiner

*Primary Examiner* — Anshul Sood
(74) *Attorney, Agent, or Firm* — Lowenstein Sandler LLP

(57) ABSTRACT

Particular embodiments described herein provide for a communication system that can be configured to receive a desired arrival time for a package to arrive at a destination, determine a location of the package, determine a route to the destination, and determine a pickup time to pick up the package. The pickup time can be at least partially based on the desired arrival time and a time to travel along the route. In an example, the package is a passenger and the communication system can involve a transportation or delivery service.

20 Claims, 7 Drawing Sheets

SYSTEM FOR NAVIGATING VEHICLES ASSOCIATED WITH A DELIVERY SERVICE

TECHNICAL FIELD

This disclosure relates in general to the field of mobile applications and, more particularly, to a delivery service.

BACKGROUND

A delivery service may utilize a plurality of vehicles that fulfill customer requests for transportation. One specific example is a transportation network company (TNC). The definition of a TNC was created by the California Public Utilities Commission in 2013, as a result of a rulemaking process around new and previously unregulated forms of transportation. Currently, a TNC is a company that uses an online-enabled platform to connect passengers with drivers.

TNCs typically develop a computing platform which creates an online marketplace where a driver registered with the company may offer the driver's own labor and vehicle to people who request a ride. The services offered by such companies include the maintenance of the marketplace where fare-paying customers can meet drivers for hire, vetting of drivers to ensure that they meet the standards of the company's own marketplace, and delivery of payment from customer to driver in their own financial transaction.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION OF EXAMPLE EMBODIMENTS

Overview

Particular embodiments described herein provide for a communication system that can be configured to receive a desired arrival time for a package to arrive at a destination, determine a location of the package, determine a route to the destination, and determine a pickup time to pick up the package. The pickup time can be at least partially based on the desired arrival time and a time to travel along the route. In an example, the package is a customer or passenger and the communication system can involve a transportation service, taxi service, transportation network company (TNC), or other driving service.

The system can also be configured to communicate the pickup time to a mobile device associated with the package or customer. The system can further be configured to determine that the pickup time should be changed, determine a new pickup time to pick up the package, and communicate the new pickup time to a mobile device associated with the package. In addition, the system can be configured to determine that a new route to the destination needs to be calculated, determine the new route to the destination, and determine a new pickup time, where the new pickup time is at least partially based on the desired arrival time and a new time to travel along the new route. In some examples, the system can be configured to determine that the location of the package has changed to a new location, determine a new route to the destination, and determine a new pickup time, where the new pickup time is at least partially based on the desired arrival time and a new time to travel along the new route. The location may change, for example, due to the fact that a passenger may move from his original pickup location. The change of the location may be determined by a location module in a mobile device associated with the passenger. Also, the system can be configured to determine that the destination needs to be changed to a new destination, determine a new route to the new destination, and determine a new pickup time, where the new pickup time is at least partially based on the desired arrival time and a new time to travel along the new route.

Example Embodiments

The following detailed description sets forth example embodiments of apparatuses, methods, and systems relating to a communication system for device pairing in a local network. Features such as structure(s), function(s), and/or characteristic(s), for example, are described with reference to one embodiment as a matter of convenience; various embodiments may be implemented with any suitable one or more of the described features.

Figure 1:
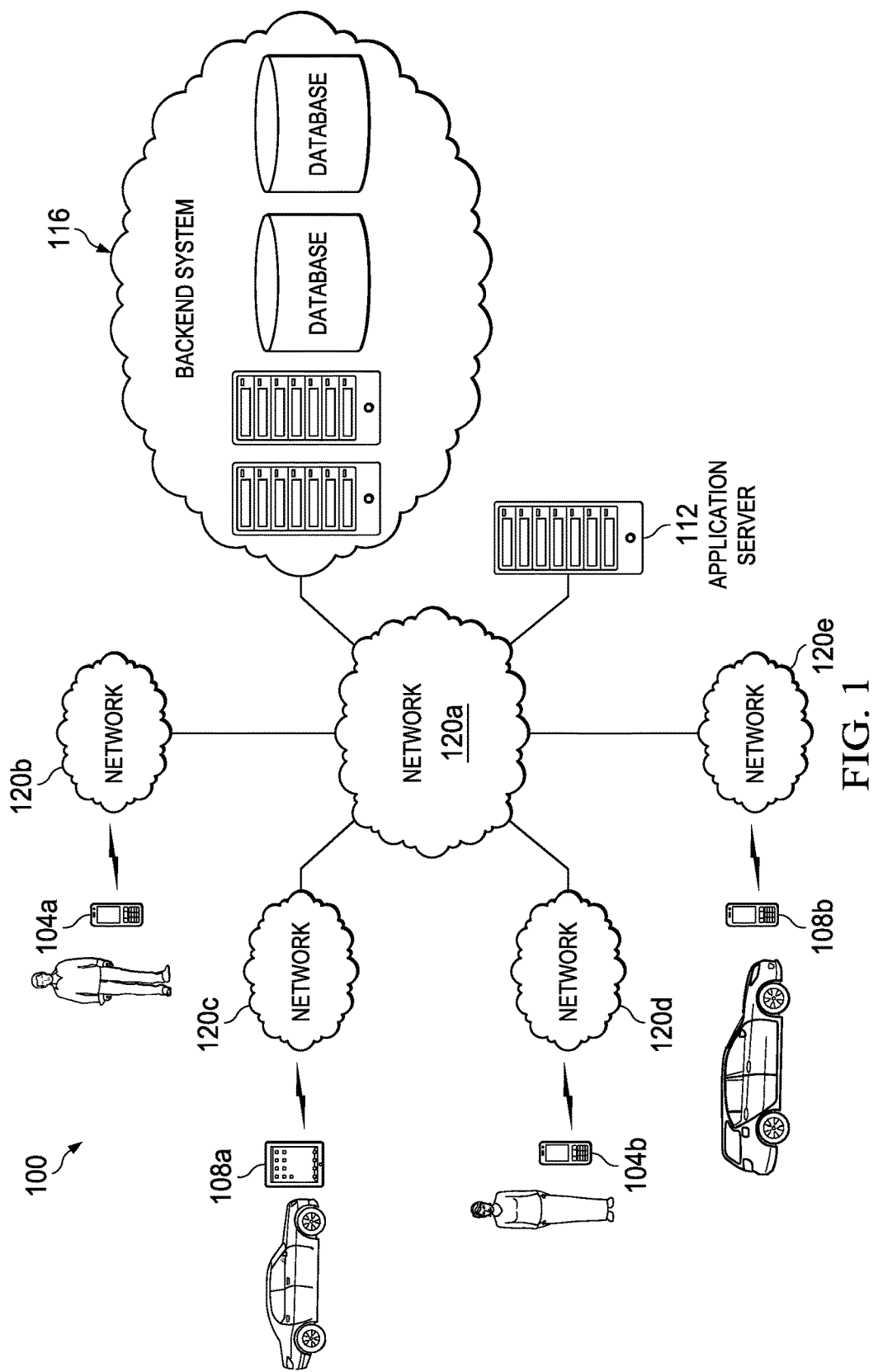
FIG. 1 is a simplified block diagram of a communication system to facilitate a delivery service in accordance with an embodiment of the present disclosure.

FIG. 1 is a simplified block diagram of a communication system 100 to facilitate a delivery service in accordance with an embodiment of the present disclosure. As illustrated in FIG. 1, an embodiment of communication system 100 can include one or more customer mobile devices 104a and 104b, one or more vehicle mobile devices 108a and 108b, an application server 112, a backend system 116, and one or more networks 120a-120e.

Customer mobile devices 104a and 104b can each be associated with a customer of the delivery service. Vehicle mobile devices 108a and 108b can each be associated with a driver or driverless vehicle for use in the delivery service. If the delivery service is associated with a transportation service, TNC service, taxi service, etc. then each mobile device 104a and 104b can be associated with a customer or a customer purchasing the transportation service for a third party user. Various embodiments may include any number of drivers, customers, and associated devices. Customer mobile devices 104a and 104b, vehicle mobile devices 108a and 108b, application server 112, and backend system 116 may be in communication using one or more networks 120a-102e.

In a specific example, various embodiments of the present disclosure may enhance the experience of a driver associated with a transportation service or driving service. A customer may specify a destination (e.g., a concert, airport, meeting center, etc.) to which the customer desires to travel and a specific time the customer would like to arrive at the destination. For example, the customer can specify that they would like to arrive at the destination at 8:00 PM (or any other specific time).

Communication system 100 can be configured to determine a route to the destination and calculate a pickup time for the customer to ensure the customer arrives at the destination at the desired time. The pickup time can be adjusted as traffic along the route changes, the location of the customer changes, or other factors are introduced that may affect the travel time to the destination and the ability of the customer to arrive at the desired location at the desired time. For example, a customer may specify that they would like to arrive at a concert at 7:00 PM. Communication system 100 can be configured to determine a location of the customer, a route to the concert, and the time it would take to travel the route, for example about 1 hour and 30 minutes, where the estimated time may be based at estimated traffic for the desired arrival time, based on historic information, based on current traffic, etc. The customer may get a notification saying that the pickup time would be 5:30 PM. If traffic along the route changes before the customer is picked up, the customer changes location, it starts to rain or snow, or other factors that could affect the arrival time are introduced, the pickup time can be adjusted, for example to 5:00 PM, or some other time that would ensure the customer arrived at the concert at the desired time of 7:00 PM.

Customer mobile devices 104a and 104b and vehicle mobile devices 108a and 108b may each include any electronic computing device operable to receive, transmit, process, and store any appropriate data to achieve, or to foster, the operations outlined herein. For example, customer mobile devices 104a and 104b and vehicle mobile devices 108a and 108b can each be a laptop computer, tablet computer, smartphone, personal digital assistant, or some other device capable of connecting (e.g., wirelessly) to one or more networks 120a-120e. Customer mobile devices 104a and 104b and vehicle mobile devices 108a and 108b may each be the same type of device, each be a different type of device, or some devices may be the same or similar devices and other devices may be different. Customer mobile devices 104a and 104b and vehicle mobile devices 108a and 108b may include a set of programs such as operating systems (e.g., Microsoft Windows, Linux, Android, Mac OSX, Apple iOS, UNIX, or similar operating system), applications, plug-ins, applets, virtual machines, machine images, drivers, executable files, and other software-based programs capable of being run, executed, or otherwise used by the respective devices. Each of customer mobile devices 104a and 104b and vehicle mobile devices 108a and 108b can include at least one graphical display and user interface allowing a user to view and interact with applications and other programs. In a particular embodiment, each of customer mobile devices 104a and 104b and vehicle mobile devices 108a and 108b may be a hardened device that is configured to only run a specific application (e.g., a delivery service or a taxi driver application) using a specialized operating system (e.g., a modified version of Android). In one embodiment, a business (e.g., transportation service, delivery service, taxi service, TNC service, etc.) may issue or otherwise facilitate the provisioning of the hardened devices to its drivers or customers but restrict the functionality of the devices to the specific application (e.g., a delivery service or a taxi driver application) such that the hardened devices may be locked down so as not to allow the installation of additional applications. Note that the term "transportation service" includes taxi services, TNC services, or other services that use a vehicle (e.g., car truck, boat, airplane, motorcycle, bicycle, carriage, train, etc.) to fulfill customer or user requests for transportation. The term "delivery service" includes services for the delivery of goods, users, customers, animals, livestock, etc. and can include a transportation service.

In various embodiments, vehicle mobile devices 108a and 108b may be integrated within and/or communicate with a self-driven vehicle (e.g., a vehicle that has the capability of driving without physical steering guidance from a human being) and may influence the movement of the vehicle by providing route information (e.g., customer pick-up and destination locations or driver destination locations) to the self-driven vehicle. Accordingly, as used herein "driver" may refer to a human being that may physically drive or otherwise control movement of a vehicle or the vehicle itself (e.g., in the case of a self-driven vehicle) or component thereof (e.g., vehicle mobile devices 108a and 108b or logic therein).

In particular embodiments, customer application runs on customer mobile devices 104a and 104b. The application may allow a user to enter various account information to be utilized by a delivery service. For example, the account information may include a user name and password (or other login credentials), contact information of the user (e.g., phone number, home address), payment information (e.g., credit card numbers and associated information), or car preference information (e.g., what models or color of car the user prefers).

The application may allow a customer to request a ride or other services from the delivery service. For example, the customer may request a vehicle to give a ride to a friend, the customer may request the delivery of goods at a specific time, such as for party or business meeting, the customer may request livestock such as a horse be delivered to a horse show, or the customer may request other services to be delivered to a specific place at a specific time. In various embodiments, the application may establish a pick-up location automatically or based on user input (e.g., locations may include the current location of customer mobile device 104a as determined by a global positioning system (GPS) of the mobile device or a different user-specified location). In certain embodiments, the user may specify a destination location as well. The locations may be specified in any suitable format, such as GPS coordinates, street address, establishment name (e.g., LaGuardia Airport, Central Park, etc.), or other suitable format. At any time (e.g., before the ride, during the ride, or after the ride is complete) the user may specify a method of payment to be used for the ride. The user may also specify whether the request is for immediate pick-up or for a specified time in the future. In various embodiments, the user may specify pick-up by a vehicle that has particular merchandise available for use by the user, such as a specified type of battery charger, bottle of water or other food or beverage, umbrella, or other suitable merchandise. The user may also specify criteria for the driver, such as a minimum performance rating, such that drivers having performance ratings below the minimum performance rating will not be considered during selection of the driver.

The user may use the application to order a ride based on the specified information. The request for the ride is generated based on the information and transmitted to backend system 116. Backend system 116 can facilitate the selection of a driver or vehicle. In some embodiments, backend system 116 may select a driver or vehicle based on any suitable factors, such as the information contained in the request from the customer, the proximity of the driver to the customer, or other suitable factors. In other embodiments, backend system 116 may select a plurality of drivers that could fulfill the ride request, send information associated with the drivers to the customer, and allow the customer to select the driver to be used via the application on the mobile device (e.g., customer mobile device 104*a*) associated with the customer. Any suitable information about the potential driver(s) may be sent to the mobile device either before or after the selection of the driver by the customer, such as a location of a driver, an estimated pick-up time, a type of car used by a driver, the merchandise available in the car, a driver rating or comments made by other customers about the driver, or other suitable information.

Once a driver has been selected and has accepted the request to provide a ride, the application may notify the user of the selected driver and provide real-time updates of the driver's location (e.g., with respect to the customer's location) and estimated pick-up time. The application may also provide contact information for the driver and/or the ability to contact the driver through the application (e.g., via a phone call or text). Once the ride has begun, the application may display any suitable information, such as the current location of the mobile device 104 and the route to be taken. Upon completion of the ride, the application may provide the customer the ability to rate the driver or provide comments about the driver.

In particular embodiments, a vehicle application runs on vehicle mobile devices 108*a* and 108*b*. The application may allow a driver to enter various account information to be utilized. For example, the account information may include a user name and password (or other login credentials), contact information of the driver (e.g., phone number, home address), information used to collect payment (e.g., bank account information), vehicle information (e.g., what model or color of car the driver utilizes), merchandise offered by the driver, or other suitable information.

In various embodiments, the application may allow a driver to specify his availability to transport goods or customers for the delivery service. The application may periodically transmit the current location of customer mobile devices 104*a* and 104*b* and vehicle mobile devices 108*a* and 108*b* as determined by a location module (e.g., GPS system) of the mobile device to the backend system 116. When a driver is selected to provide a ride, backend system 116 may send a notification to the customer application. In some embodiments, the driver may have a limited amount of time to select whether the driver accepts the ride. In other embodiments, the application may be configured by the driver to automatically accept the ride or to automatically accept the ride if certain criteria are met (e.g., fare minimum, direction of travel, minimum customer rating, etc.).

When a ride is accepted, the application may navigate the driver to the goods, customer, $3^{rd}$ party (as designated by the customer), etc. The application may also provide contact information for the customer and/or the ability to contact the customer through the vehicle application (e.g., via a phone call or text). The vehicle application may also navigate the driver to the destination once the ride begins. Upon completion of the ride, the application may provide the driver the ability to rate the customer or provide comments about the customer.

System 100 may include one or more application servers 112 coupled to the mobile devices through one or more networks 120. The customer application and vehicle application may be supported with, downloaded from, served by, or otherwise provided through an application server 112 or other suitable means. In some instances, the applications can be downloaded from an application storefront onto a particular mobile device using storefronts such as Google Android Market, Apple App Store, Palm Software Store and App Catalog, RIM App World, etc., as well as other sources. In various embodiments, the customer application and vehicle application may be installed on their respective devices in any suitable manner and at any suitable time. As one example, a customer application may be installed on a mobile device as part of a suite of applications that are pre-installed prior to provision of the mobile device to a consumer. As another example, a vehicle application may be installed on a mobile device (associated with a driver) by a transportation service, delivery service or TNC (or an entity that provisions mobile devices for transportation service, delivery service, or TNC) prior to the issuance of the device to a driver that is employed or otherwise associated with the delivery service.

As described above, applications utilized by customer mobile devices 104*a* and 104*b* and vehicle mobile devices 108*a* and 108*b* can make use of a backend system 116. Backend system 116 may comprise any suitable servers or other computing devices that facilitate the provision of a delivery service as described herein. For example, backend system 116 may receive a request from a customer and facilitate the assignment of a driver to fulfill the request. Backend system 116 is described in more detail in connection with FIG. 3.

In general, "servers," and other "computing devices" may include electronic computing devices operable to receive, transmit, process, store, or manage data and information associated with system 100. As used in this document, the term "computing device," is intended to encompass any suitable processing device. For example, the system 100 may be implemented using computers other than servers, including server pools. Further, any, all, or some of the computing devices may be adapted to execute any operating system, including Linux, UNIX, Windows Server, etc., as well as virtual machines adapted to virtualize execution of a particular operating system, including customized and proprietary operating systems, as well as containers like Docker containers running on a cloud or on a PAAS platform.

Further, servers and other computing devices of system 100 can each include one or more processors, computer-readable memory, and one or more interfaces, among other features and hardware. Servers can include any suitable software component or module, or computing device(s) capable of hosting and/or serving a software application or services (e.g., services of application server 112 or backend system 116), including distributed, enterprise, or cloud-based software applications, data, and services. For instance, servers can be configured to host, serve, or otherwise manage data sets, or applications interfacing, coordinating with, or dependent on or used by other services, including delivery service applications and software tools. In some instances, a server, system, subsystem, or computing device can be implemented as some combination of devices that can be hosted on a common computing system, server, server pool, or cloud computing environment and share computing resources, including shared memory, processors, and interfaces. In various embodiments, backend system 116 or any components thereof may be deployed using a cloud service such as Amazon Web Services, Microsoft Azure, or Google Cloud Platform. For example, the functionality of the backend system 116 may be provided by virtual machine servers that are deployed for the purpose of providing such functionality or may be provided by a service that runs on an existing platform.

System 100 also includes various networks 120a-120e used to facilitate communicate data between customer mobile devices 104a and 104b, vehicle mobile devices 108a and 108b, backend system 116, and application server 112. Networks 120a-120e described herein may be any suitable network or combination of one or more networks operating using one or more suitable networking protocols. A network may represent a series of points, nodes, or network elements and interconnected communication paths for receiving and transmitting packets of information. For example, a network may include one or more routers, switches, firewalls, security appliances, antivirus servers, or other useful network elements. A network may provide a communicative interface between sources and/or hosts, and may comprise any public or private network, such as a local area network (LAN), wireless local area network (WLAN), metropolitan area network (MAN), Intranet, Extranet, Internet, wide area network (WAN), virtual private network (VPN), cellular network (implementing GSM, CDMA, 3G, 4G, LTE, etc.), or any other appropriate architecture or system that facilitates communications in a network environment depending on the network topology. A network can comprise any number of hardware or software elements coupled to (and in communication with) each other through a communications medium. In some embodiments, a network may simply comprise a transmission medium such as a cable (e.g., an Ethernet cable), air, or other transmission medium.

Figure 2:
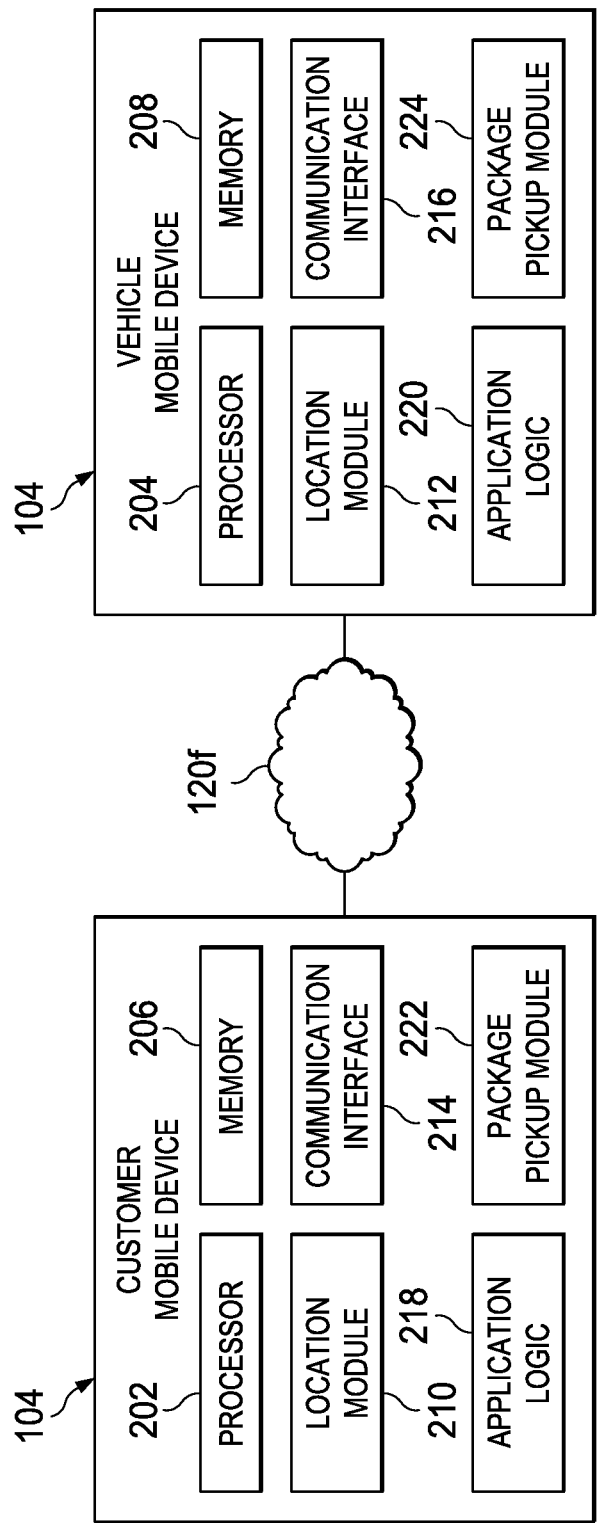
FIG. 2 is a simplified block diagram of a portion of a communication system to facilitate a delivery service in accordance with an embodiment of the present disclosure.

Turning to FIG. 2, FIG. 2 is a simplified block diagram of a portion of communication system 100 to facilitate a delivery service in accordance with an embodiment of the present disclosure. As illustrated in FIG. 2, customer mobile device 104 (e.g., customer mobile device 104a or 104b) can include a processor 202, memory 206, a location module 210 (e.g., a GPS), a communication interface 214, application logic 218, and a package pickup module 222. A vehicle mobile device 108 (e.g., vehicle mobile device 108a or 108b) can include a processor 204, memory 208, a location module 212 (e.g., a GPS), a communication interface 216, application logic 220, and a package pickup module 224.

In an embodiment, customer mobile device 104 and vehicle mobile device 108 can each include a computer system to facilitate performance of their respective operations. In particular embodiments, a computer system may include a processor, storage, and one or more communication interfaces, among other components. As an example, customer mobile device 104 and vehicle mobile device 108 can each include one or more processors 202 and 204, memory elements 206 and 208, and communication interfaces 214 and 216, among other hardware and software. These components may work together in order to provide functionality described herein.

Processors 202 and 204 may be a microprocessor, controller, or any other suitable computing device, resource, or combination of hardware, stored software and/or encoded logic operable to provide, either alone or in conjunction with other components of customer mobile device 104 and vehicle mobile device 108, the functionality of these mobile devices. In particular embodiments, mobile devices 104 and 108 may utilize multiple processors to achieve, or to foster, operations as outlined herein.

A processor can execute any type of instructions to achieve the operations detailed in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

Memory 206 and 208 may comprise any form of non-volatile or volatile memory including, without limitation, random access memory (RAM), read-only memory (ROM), magnetic media (e.g., one or more disk or tape drives), optical media, solid state memory (e.g., flash memory), removable media, or any other suitable local or remote memory component or components. Memory 206 and 208 may store any suitable data or information utilized by customer mobile device 104 and vehicle mobile device 108, including software embedded in a computer readable medium, and/or encoded logic incorporated in hardware or otherwise stored (e.g., firmware). Memory 206 and 208 may also store the results and/or intermediate results of the various calculations and determinations performed by processors 202 and 204.

Communication interfaces 214 and 216 may be used for the communication of signaling and/or data between customer mobile device 104 and vehicle mobile device 108 and one or more networks (e.g., network 120f) and/or network nodes (e.g., backend system 116 and application server 112) coupled to a network or other communication channel. For example, communication interfaces 214 and 216 may be used to send and receive network traffic such as data packets. Each communication interface 214 and 216 may send and receive data and/or signals according to a distinct standard such as an LTE, IEEE 802.11, IEEE 802.3, or other suitable standard. Communication interfaces 214 and 216 may include antennae and other hardware for transmitting and receiving radio signals to and from other devices in connection with a wireless communication session over one or more networks 120.

Location modules 210 and 212 may include any suitable hardware and/or software for detecting a location of their respective customer mobile device 104 and vehicle mobile device 108. For example, a GPS unit may include a system that receives information from GPS satellites, wireless or cellular base stations, and/or other suitable source and calculates a location based on this information (or receives a calculated position from a remote source). In one embodiment, the GPS unit is embodied in a GPS chip.

Application logic 218 may include logic providing, at least in part, the functionality of the customer application described herein. Similarly, application logic 220 may include logic providing, at least in part, the functionality of the vehicle application described herein. In a particular embodiment, the logic of customer mobile device 104 and vehicle mobile device 108 may include software that is executed by processor 202 and 204. However, "logic" as used herein, may include but not be limited to hardware, firmware, software and/or combinations of each to perform a function(s) or an action(s), and/or to cause a function or action from another logic, method, and/or system. In various embodiments, logic may include a software controlled microprocessor, discrete logic (e.g., an application specific integrated circuit (ASIC)), a programmed logic device (e.g., a field programmable gate array (FPGA)), a memory device containing instructions, combinations of logic devices, or the like. Logic may include one or more gates, combinations of gates, or other circuit components. Logic may also be fully embodied as software.

In various embodiments of the present disclosure, in addition to any combination of the features described above with respect to the vehicle application, application logic 220 may provide additional features for the vehicle application to enhance a driver's experience. In various embodiments, the vehicle application allows a driver to indicate a destination. The destination may represent an intended destination of the customer. The destination may be specified in any suitable format, such as GPS coordinates, street address, establishment name (e.g., LaGuardia Airport, Central Park, etc.), or other suitable format. In various embodiments, commonly used locations may be stored by vehicle mobile device 108. Application logic 220 may also provide a search function to allow the driver to search for the destination location based on one or more keywords or characteristics (e.g., the name of an establishment).

Each package pickup module 222, 224, and 340 (illustrated in FIG. 3) can be configured to receive a desired arrival time for a package to arrive at a destination, determine a location of the package, determine a route to the destination, and determine a pickup time to pick up the package. Each package pickup module 222, 224, and 340 can also be configured to determine when the pickup time should be changed or adjusted (e.g., to account for an increase of traffic along the route due to a traffic accident, weather, etc.) and recalculate the pickup time.

Figure 3:
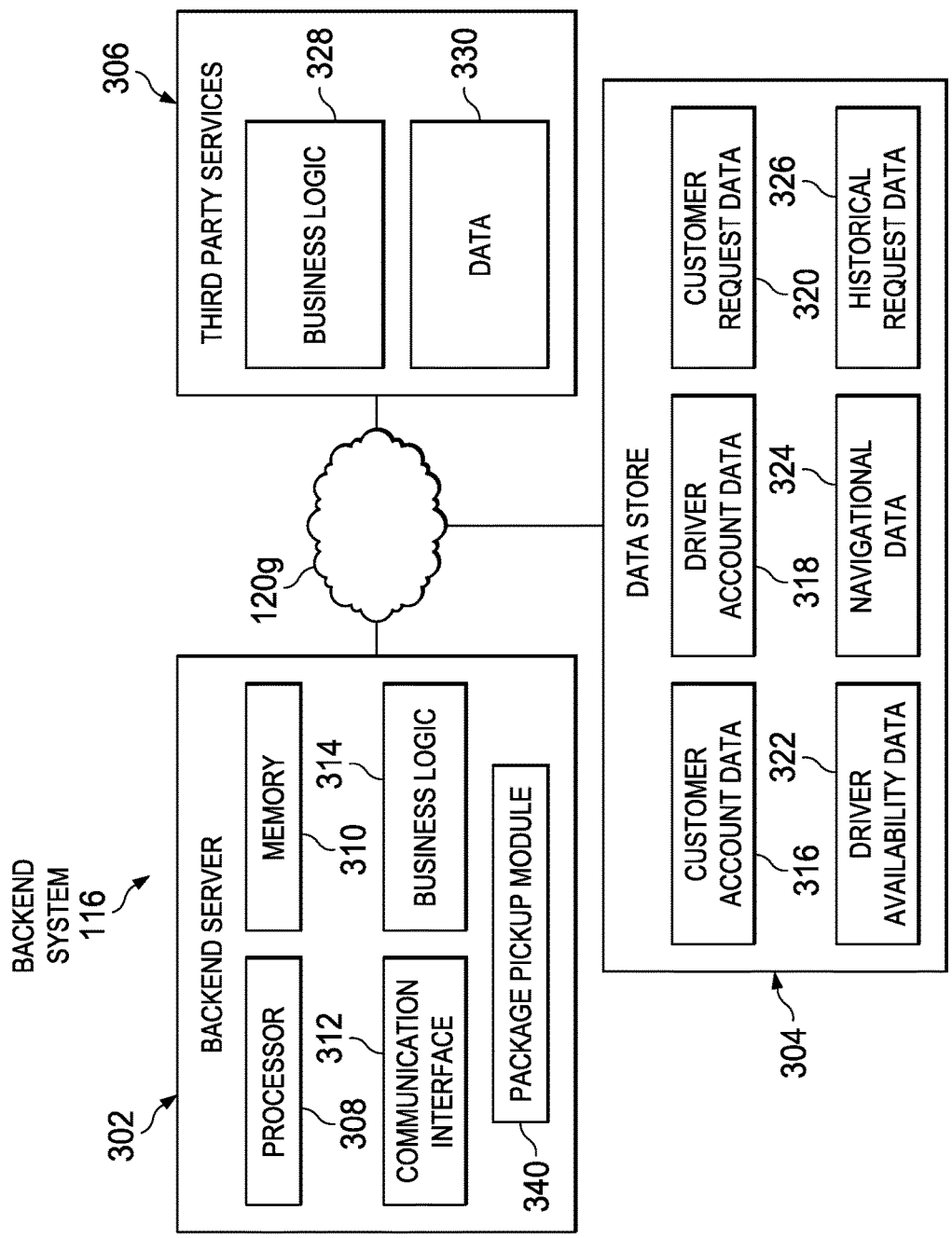
FIG. 3 is a simplified block diagram of a portion of a communication system to facilitate a delivery service in accordance with an embodiment of the present disclosure.

Turning to FIG. 3, FIG. 3 is a simplified block diagram of a portion of communication system 100 to facilitate a delivery service in accordance with an embodiment of the present disclosure. As illustrated in FIG. 3, backend system 116 can include a backend server 302, a data store 304, and third party services 306. Backend server 302 can include a processor 308, memory 310, communication interface 312, business logic 314, and a package pickup module 340. Data store 304 can include customer account data 316, driver account data 318, customer request data 320, driver availability data 322, navigational data 324, and historical request data 326. Third party services 306 can include business logic 328 and data 330. Although FIG. 3 depicts a particular implementation of backend system 116, the backend system may include any suitable devices to facilitate the operation of the delivery service described herein. In the embodiment depicted, backend system includes backend server 302, data store 304, and third party services 306 coupled by network 120g. In various embodiments, backend server 302, data store 304, and/or third party services 306 may each comprise one or more physical devices (e.g., servers or other computing devices) providing the functionality described herein. In some embodiments, one or more of backend server 302, data store 304, and third party services 306 (or portions thereof) are deployed using a cloud service and may comprise one or more virtual machines or containers.

In an example, backend server 302 can include a computer system to facilitate performance of its operations. As an example, backend server 302 includes one or more processors 308, memory elements 310, communication interfaces 312, and a package pickup module 340 among other hardware and software. These components may work together in order to provide backend server functionality described herein. Processor 308 may have any suitable characteristics of the processors 202 and 204 described above. In particular embodiments, backend server 302 may utilize multiple processors to perform the functions described herein.

Similarly, memory 310 may have any suitable characteristics of memories 206 and 208 described above. Memory 310 may store any suitable data or information utilized by backend server 302, including software embedded in a computer readable medium, and/or encoded logic incorporated in hardware or otherwise stored (e.g., firmware). Memory 310 may also store the results and/or intermediate results of the various calculations and determinations performed by processor 308.

In an example implementation, network elements of communication system 100, may include software modules (e.g., package pickup modules 222, 224, and 340) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as hardware, firmware, partial software, or any suitable combination thereof. These elements may also include software (or reciprocating software) that can coordinate with other network elements in order to achieve the operations, as outlined herein.

Communication interface 312 may have any suitable characteristics of communication interfaces 214 and 216 described above. Communication interfaces 312 may be used for the communication of signaling and/or data between backend server 302 and one or more networks (e.g., networks 120) and/or network nodes (e.g., mobile devices 104 and 108, data store 304, third party services 306, and application server 112) coupled to a network or other communication channel.

Business logic 314 may have any suitable characteristics of application logic 218 and 220 described above. Business logic 314 may include logic providing, at least in part, the functionality of the backend server described herein. In a particular embodiment, business logic 314 may include software that is executed by processor 308. However, in other embodiments, business logic 314 may take other forms such as those described above with respect to application logic 218 and 220.

Backend server 302 may communicate with data store 304 to initiate storage and retrieval of data related to the delivery service. Data store 304, may store any suitable data associated with the delivery service in any suitable format(s). For example, data store 304 may include one or more database management systems (DBMS), such as SQL Server, Oracle, Sybase, IBM DB2, or NoSQL data bases (e.g., Redis and MongoDB). In the embodiment depicted, data store 304 includes customer account data 316, driver account data 318, customer route data 320, driver availability data 322, navigational data 324, and historical route data 326. The various data may be updated at any suitable intervals.

Customer account data 316 may include any suitable information associated with customer accounts, such as contact information (e.g., real names and addresses), user names and passwords (or other authentication information), payment information (e.g., credit card or bank account numbers and associated information), customer preferences (e.g., preferred type or color of car), ratings the customer has given drivers, ratings the customer has received from drivers, or other information associated with customer profiles.

Driver account data 318 may include any suitable information associated with driver accounts, such as contact information (e.g., real names and addresses), user names and passwords (or other authentication information), payment collection information (e.g., bank account information), vehicle information (e.g., models and colors of cars the drivers utilize, maximum capacity of the cars of the drivers), merchandise offered by the drivers, whether the drivers are available to transport customers, whether the drivers have opted for automatic acceptance of customer requests (whereby the backend server 302 may assign a customer request to the driver without waiting for the driver to indicate acceptance of a request), or other suitable information.

Customer request data 320 may include pending requests (i.e., requests that have not yet been fulfilled) received from customers. Each request may include any suitable information, such as any combination of one or more of an identification of the customer making the request, the time the request was made, the current location of the customer, the desired pick-up location, the desired pick-up time, the estimated time remaining until a driver can pick up the customer, the actual pick-up time, the desired destination location of the customer (which the customer may or may not provide at the time the request is made), the type of vehicle requested, estimated fare for the trip, current accumulated fare for the trip, estimated time and mileage remaining in the trip, other information specified by the user (e.g., requested merchandise, requested minimum rating of driver), whether a driver has been assigned to a request, and which driver has been assigned to a request.

Driver availability data 322 may include information associated with drivers that are available to transport customers. In some embodiments, driver availability data 322 may also include information associated with drivers that are not available to transport customers (e.g., because they are off-duty or currently transporting a customer). An entry in the driver availability data 322 may include an identification of a driver and any suitable associated information, such as one or more of a current location of the driver, whether the driver is available to transport customers, whether the driver is currently transporting a customer, a destination location of a current trip of the driver, an estimate of how long it will be before the driver finishes his current trip, whether the driver has opted for automatic acceptance of customer requests, or other suitable information.

Navigational data 324 may include information supporting navigation functions provided by the customer applications and vehicle applications. For example, navigational data 324 may include map data that may be sent to customer mobile device 104 and vehicle mobile device 108 to allow the devices to display maps and associated indicators (e.g., location of customer(s), location of driver(s), desired routes, etc.) In some embodiments, the navigational data may also include information indicative of the amount of time required to travel between various locations. In some embodiments, navigational data 324 may include historic and/or real time data about the flow of traffic in particular areas enabling backend server 302 to calculate an estimated time required to travel from one location to another.

Historical request data 326 may include information about completed requests. In some embodiments, historical request data 326 may also include information about canceled requests. The information for each request may include any combination of the information listed above with respect to requests stored in the customer request data 320 as well as any combination of additional data such as the time at which the destination location was reached, the total time of the trip, the total fare, a rating given by the customer to the driver or by the driver to the customer for the trip, or other suitable information associated with the trip.

In various embodiments, backend server 302 may access third party services 306 through business logic 328 to access data 330. Third party services 306 may represent any suitable number of devices operated by any suitable number of third parties that are distinct from an entity that operates the backend system 116 and/or data store 304. For example, in some embodiments the navigational data may be obtained from a third party service 306 rather than data store 304, or additional third party navigational data such as map data or historical and/or current traffic flow information may be used to supplement navigational data 324. As another example, third party services 306 may authenticate users on behalf of the backend server 302 (e.g., through an account of the user with the third party). Business logic 328 may include any suitable logic operable to receive requests for data from backend system 116 and/or mobile devices 104 and 108 and provide responses to the requests.

Backend server 302 may be in communication with each customer mobile device 104 and each vehicle mobile device 108 that is utilizing the delivery service at a particular time. Backend server may store information received from the mobile devices 104 and 108 in data store 304. Backend server 302 may also receive and respond to requests made by mobile devices 104 and 108 by processing information retrieved from data store 304.

When a customer opens the customer application, the backend server 302 may log the customer in based on a comparison of authentication information provided by the customer mobile device 104 with authentication information stored in customer account data 316. The customer may then request a ride or other delivery service. The request is received by the backend server 302 and stored in customer request data 320. Backend server 302 may access driver availability data 322 to determine one or more drivers that would be suitable to fulfill the request from the customer. In one embodiment, backend server 302 selects a particular driver (e.g., based on the driver's locality with respect to the customer's pick-up location) and sends information associated with the request to the driver. The driver indicates whether he accepts or rejects the request via vehicle mobile device 108. If the driver rejects the request, backend server 302 selects a different driver and the process is repeated until the backend server 302 receives an accepted request from a driver. In another embodiment, backend server 302 may select a plurality of drivers that may fulfill a customer's request and allow the customer to select one of the drivers. The backend server 302 may proceed to notify the driver of the request in a similar manner to that described above. In yet another embodiment, backend server 302 may select a plurality of drivers that may fulfill a customer's request and notify each driver of the customer's request. The backend server 302 may then allocate the request to one of the drivers based on any suitable criteria. For example, the driver who is the first to accept the request may be assigned to the request. As another example, if multiple drivers accept the request within a given timeframe, the request may be assigned to the most suitable driver (e.g., the driver that is closest to the pick-up location or a driver that has a car that meets preferred characteristics of the customer's request). Once the request has been accepted by a driver, backend server 302 notifies the customer that a driver has accepted his request and provides any suitable information associated with the driver (e.g., driver's current location, model and color of vehicle, estimated time of arrival, etc.) to the customer.

Backend server 302 may provide navigation information to vehicle mobile device 108 to direct the driver to the customer's pickup location and subsequently to direct the driver to the customer's destination location. Backend server 302 may also provide real-time updates associated with the trip to both the customer and the driver.

Once the customer's destination location has been reached, backend server 302 may facilitate payment of the fare for the trip using payment information stored in customer account data 316 and/or driver account data 318 (or information supplied by the customer at the time of the transaction). Backend server 302 may also receive ratings associated with the trip for the customer and driver and store these ratings in data store 304. In various embodiments, backend server 302, in conjunction with a mobile device 108, may enhance a driver's experience by allowing the driver to specify a destination location to which the driver desires to travel in connection with the transportation of customers and selecting customers for the driver based on the destination location specified by the driver.

Figure 4:
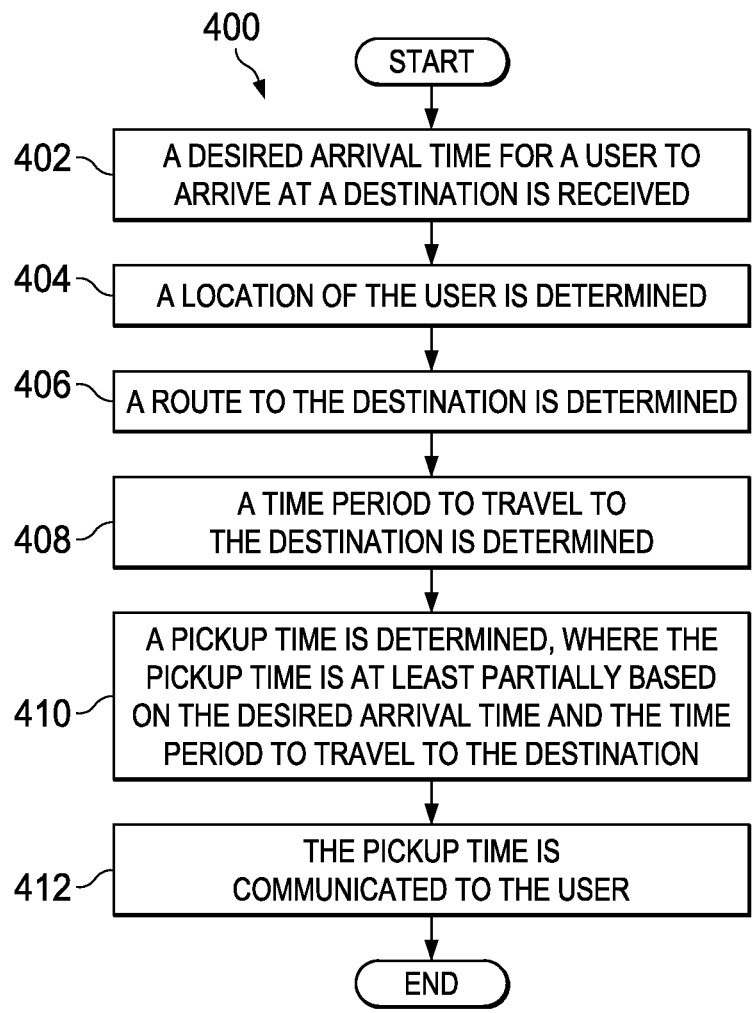
FIG. 4 is a simplified flowchart illustrating potential operations that may be associated with the communication system in accordance with an embodiment.

Turning to FIG. 4, FIG. 4 is an example flowchart illustrating possible operations of a flow 400 that may be associated with determining a pickup time, in accordance with an embodiment. In an embodiment, one or more operations of flow 400 may be performed by one or more of pickup module 222, 224, and 340. At 402, a desired arrival time for a user to arrive at a destination is received. In an example, the user may be a customer, goods for an event, animals or livestock such as a horse for a horse shown, or some other person, thing, or items than a user want delivered to a specific place at a specific time. At 404, a location of the user is determined. In an example, the location may be a location of a customer, goods, animal, livestock, etc. In another example, the location may be a location preconfigured by the user (e.g., a home or residence of the user, a workplace of the user, a specific location the user would like to be picked up, etc.) or the location may be a dynamic location where the user is walking along a street and the location of the user is determined by a location module or GPS. At 406, a route to the destination is determined. At 408, a time period to travel to the destination is determined. At 410, a pickup time is determined, where the pickup time is at least partially based on the desired arrival time and the time period to travel to the destination. At 412, the pickup time is communicated to the user. In an example, the pickup time can be determined by the distance between the pickup location and the destination, the estimated traffic during the travel time to the destination (e.g., rush hour traffic, an event such as a concert or sporting event is occurring which will increase traffic along the route, etc.), the forecasted weather (e.g., rain or snow typically causes an increase in travel time), if there is any construction along the route, and other factors that can affect the travel time from the pickup location to the destination. For example, if the desired arrival time is 7:00 pm and it takes an average of 1 hour to travel from the pickup location to the destination the pickup time may be 6:00 pm. However, if rush hour traffic occurs around 6:00 pm then the pickup time can be moved to 5:30 pm to accommodate the rush hour traffic. Also, if rain or snow is predicted during the travel time, then the pickup time may be moved to 5:15 pm.

Figure 5:
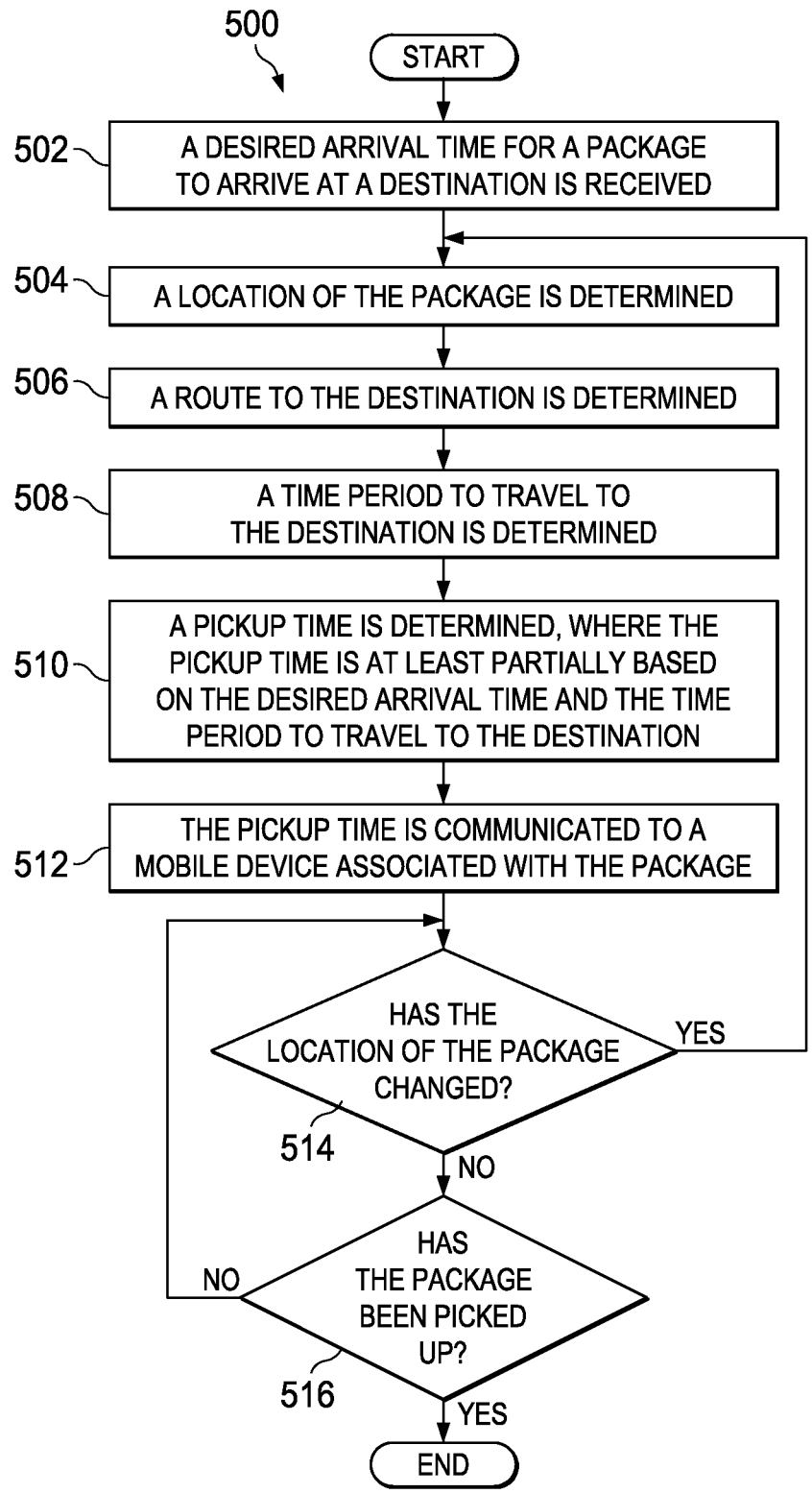
FIG. 5 is a simplified flowchart illustrating potential operations that may be associated with the communication system in accordance with an embodiment.

Turning to FIG. 5, FIG. 5 is an example flowchart illustrating possible operations of a flow 500 that may be associated with determining a pickup time, in accordance with an embodiment. In an embodiment, one or more operations of flow 500 may be performed by one or more of pickup module 222, 224, and 340. At 502, a desired arrival time for a package to arrive at a destination is received. In an example, the package may be a user, customer, passenger, etc. At 504, a location of the package is determined. In an example, the package may be a customer, user, passenger, goods, animal, livestock, etc. At 506, a route to the destination is determined. At 508, a time period to travel to the destination is determined. At 510, a pickup time is determined, where the pickup time is at least partially based on the desired arrival time and the time period to travel to the destination. At 512, the pickup time is communicated to a mobile device associated with the package. In an example, the mobile device may be associated with a user, customer, or passenger who ordered a delivery service for the package. At 514, the system determines if the location of the package has changed. If the location of the package has changed, then a (new) location of the package is determined, as in 504. If the location has not changed, then the system determines if the package has been picked up, as in 516. If the package has not been picked up, then the system determines if the location of the package has changed, as in 514. If the package has been picked up, then the process ends.

Figure 6:
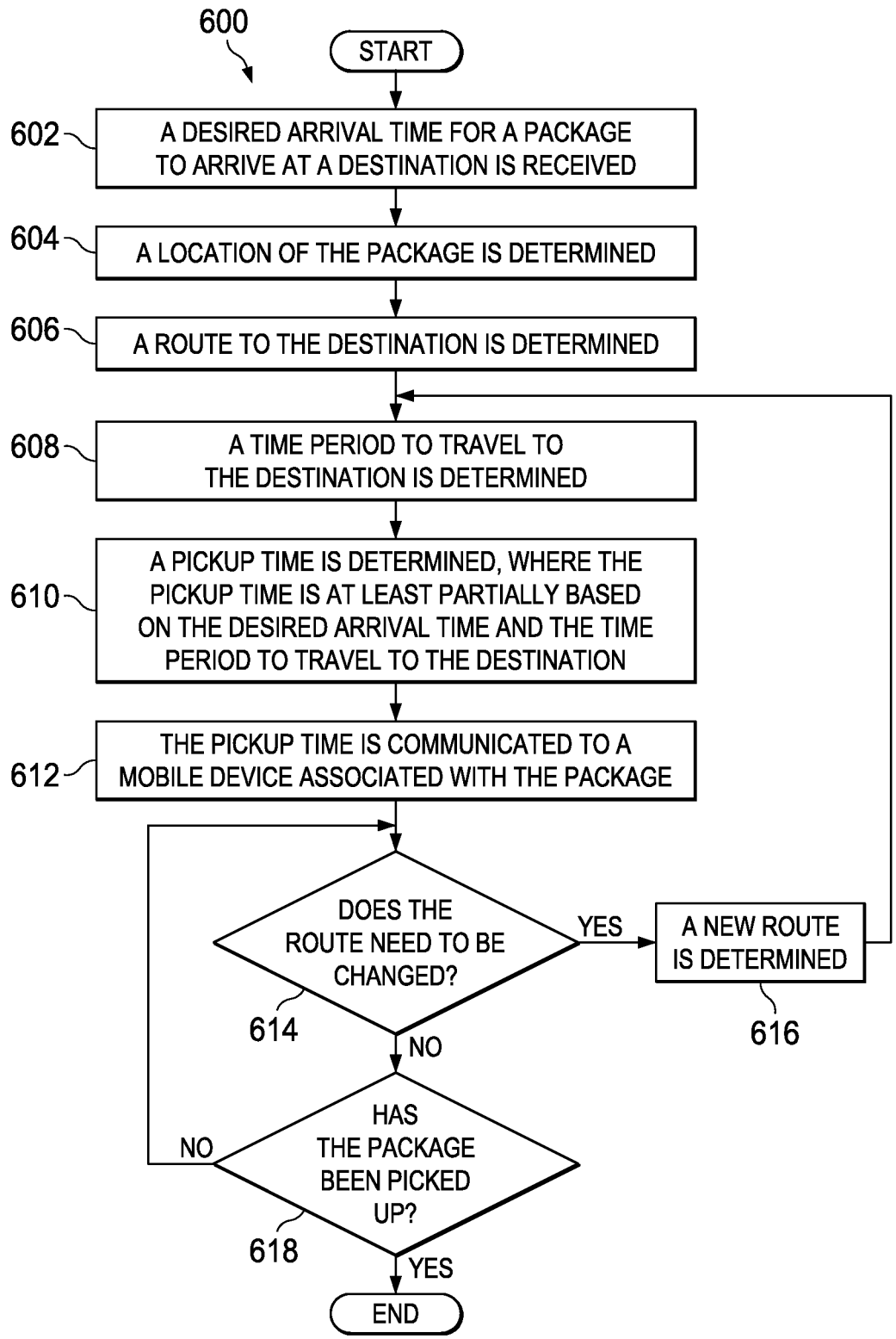
FIG. 6 is a simplified flowchart illustrating potential operations that may be associated with the communication system in accordance with an embodiment.

Turning to FIG. 6, FIG. 6 is an example flowchart illustrating possible operations of a flow 600 that may be associated with determining a pickup time, in accordance with an embodiment. In an embodiment, one or more operations of flow 600 may be performed by one or more of pickup module 222, 224, and 340. At 602, a desired arrival time for a package to arrive at a destination is received. In an example, the package may be a user, customer, passenger, goods, animal, livestock, etc. At 604, a location of the package is determined. At 606, a route to the destination is determined. At 608, a time period to travel to the destination is determined. At 610, a pickup time is determined, where the pickup time is at least partially based on the desired arrival time and the time period to travel to the destination. At 612, the pickup time is communicated to a mobile device associated with the package. In an example, the mobile device may be associated with a user, customer, or passenger who ordered a delivery service for the package. At 614, the system determines if the route needs to be changed. If the route needs to be changed, then a new route is determined, as in 616. At 608, a (new) time period to travel to the destination is determined. If the route does not need to be changed, then the system determines if the package has been picked up, as in 616. If the package has not been picked up, then the system determines if the route needs to be changed, as in 614. If the package has been picked up, then the process ends.

Figure 7:
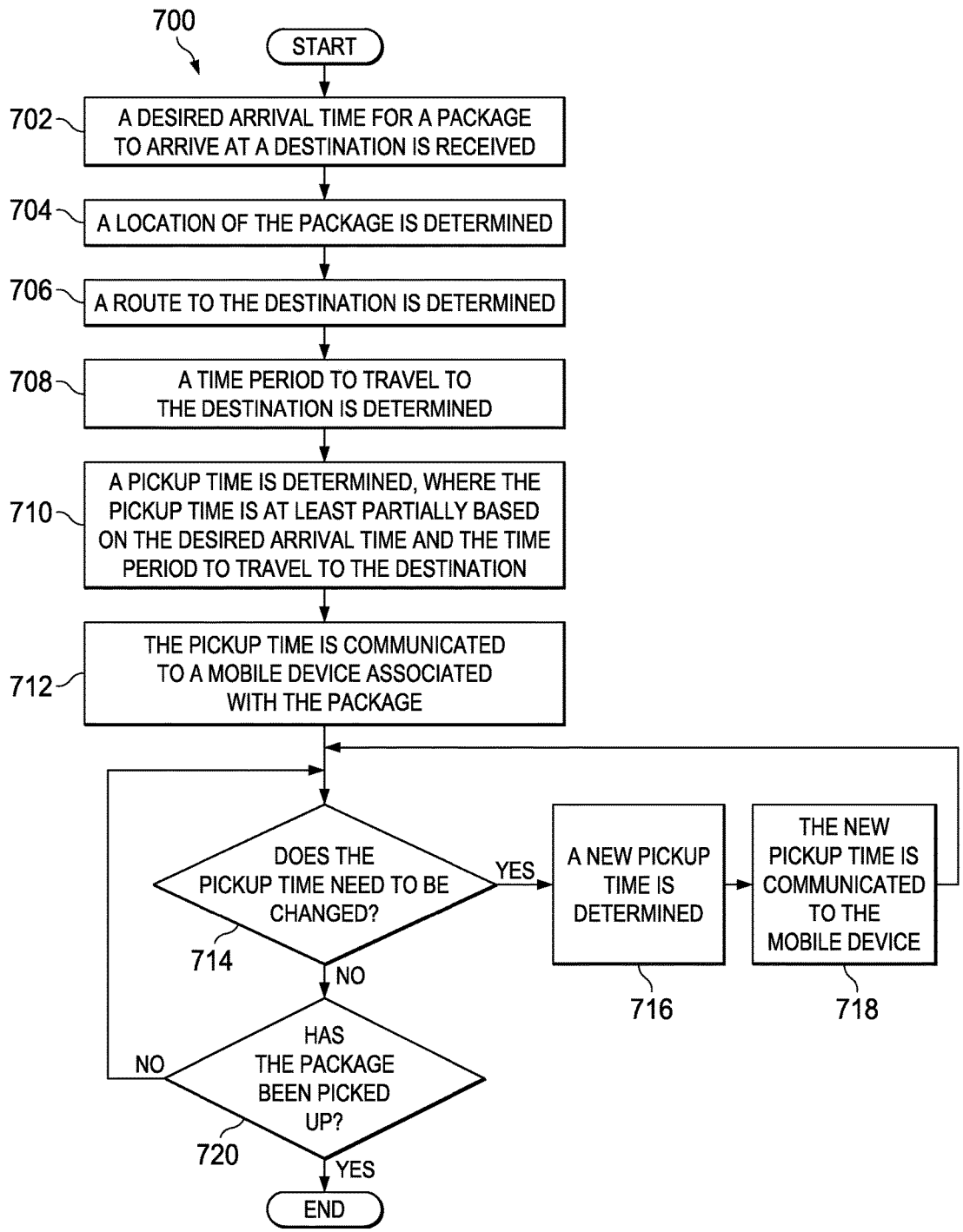
FIG. 7 is a simplified flowchart illustrating potential operations that may be associated with the communication system in accordance with an embodiment.

Turning to FIG. 7, FIG. 7 is an example flowchart illustrating possible operations of a flow 700 that may be associated with determining a pickup time, in accordance with an embodiment. In an embodiment, one or more operations of flow 700 may be performed by one or more of pickup module 222, 224, and 340. At 702, a desired arrival time for a package to arrive at a destination is received. In an example, the package may be a user, customer, passenger, goods, animal, livestock, etc. At 704, a location of the package is determined. At 706, a route to the destination is determined. At 708, a time period to travel to the destination is determined. At 710, a pickup time is determined, where the pickup time is at least partially based on the desired arrival time and the time period to travel to the destination. At 712, the pickup time is communicated to a mobile device associated with the package. In an example, the mobile device may be associated with a user, customer, or passenger who ordered a delivery service for the package. At 714, the system determines if the pickup time needs to be changed. If the pickup time needs to be changed, then a new pickup time is determined, as in 716. At 718, the new pickup time is communicated to the mobile device. If the pickup time has not changed, then the system determines if the package has been picked up, as in 720. If the package has not been picked up, then the system determines if the pickup time needs to be changed, as in 714. If the package has been picked up, then the process ends.

It is important to note that the above flowcharts (i.e., flowcharts illustrated in FIGS. 4-7) illustrate only some of the possible scenarios that may be executed by, or within, the various components of the system described herein. Some of these steps may be deleted or removed where appropriate, or these steps may be modified or changed considerably without departing from the scope of the present disclosure. In addition, a number of these operations may have been described as being executed concurrently with, or in parallel to, one or more additional operations. However, the timing of these operations may be altered considerably. The preceding operational flows have been offered for purposes of example and discussion.

The functionality described herein may also be performed by any suitable component of the system. For example, certain functionality described herein as being performed by backend server 116, may, in various embodiments, be performed by any combination of one or more customer mobile devices 104 or vehicle mobile devices 108 where appropriate. Similarly, certain functionality described herein as being performed by a customer mobile device 104 or a vehicle mobile device 108 may, in various embodiments, be performed by backend server 116 where appropriate.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 100 and its teachings are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the operations in the preceding flow diagrams (i.e., FIGS. 4-7) illustrate only some of the possible correlating scenarios and patterns that may be executed by, or within, communication system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication system 100 has been illustrated with reference to particular elements and operations that facilitate the communication process, these elements and operations may be replaced by any suitable architecture, protocols, and/or processes that achieve the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   receiving, by a processing device via a network from a mobile device associated with a user, a transportation request comprising a desired arrival time for the user to arrive at a destination and a location of the mobile device determined by a global positioning system (GPS) of the mobile device;
   determining, by the processing device, a route to the destination based on the location of the mobile device and the destination;
   calculating, by the processing device, a pickup time to pick up the user based on the desired arrival time, one or more factors affecting ability for the user to arrive at the destination at the desired arrival time, and a time to travel along the route;
   determining, by the processing device before the user is picked up, changes to the one or more factors;
   determining, by the processing device, a new route to the destination based on the location of the mobile device, the destination, and the changes to the one or more factors;
   calculating, by the processing device, a new pickup time based on the desired arrival time, the changes to the one or more factors, and a new time to travel along the new route;
   selecting, by the processing device, a driver computing device based on the location of the mobile device, the new pickup time, and driver availability data;
   receiving, from the driver computing device, a driver location of the driver computing device determined by the driver computing device;
   transmitting, by the processing device via the network to the driver computing device based on the new route and the new pickup time, navigational data to direct the driver to pick up the user and to direct the driver to the destination from the location of the mobile device to fulfill the transportation request; and providing, to the mobile device, updates of the driver location of the driver computing device.

2. The method of claim 1, wherein the user is a passenger.

3. The method of claim 1, further comprising:
communicating the pickup time to the mobile device associated with the user.

4. The method of claim 3, wherein the one or more factors comprise weather conditions, wherein the changes to the one or more factors comprise changes in the weather conditions, and wherein the method further comprises:
communicating the new pickup time to the mobile device associated with the user.

5. The method of claim 3, wherein the one or more factors comprise traffic conditions, wherein the changes to the one or more factors comprise changes in the traffic conditions, and wherein the method further comprising:
communicating the new pickup time to the mobile device associated with the user.

6. The method of claim 1, further comprising:
determining that the location of the user has changed to a new location;
determining an updated route to the destination based on the new location; and
determining an updated pickup time based on the desired arrival time and an updated time to travel along the updated route.

7. The method of claim 1 further comprising:
receiving an opt-in from the driver computing device for automatic acceptance of transportation requests; and
responsive to receiving the transportation request, assigning the transportation request to the driver computing device without waiting to receive acceptance of the transportation request from the driver computing device.

8. The method of claim 1, wherein the driver is a self-driven vehicle and the driver computing device is coupled with the self-driven vehicle, wherein the driver computing device is to influence movement of the self-driven vehicle based on the navigational data.

9. An apparatus comprising:
a memory; and
a processing device communicably coupled to the memory, the processing device to execute instructions to:
receive, via a network from a mobile device associated with a user, a transportation request comprising a desired arrival time for the user to arrive at a destination and a location of the mobile device;
determine a route to the destination based on the location of the mobile device and the destination;
calculate a pickup time to pick up the user based on the desired arrival time, one or more factors affecting ability for the user to arrive at the destination at the desired arrival time, and a time to travel along the route;
determine, before the user is picked up, changes to the one or more factors;
determine a new route to the destination based on the location of the mobile device, the destination, and the changes to the one or more factors;
calculate a new pickup time based on the desired arrival time, the changes to the one or more factors, and a new time to travel along the new route;
select a driver computing device based on the location of the mobile device, the new pickup time, and driver availability data;
receive, from the driver computing device, a driver location of the driver computing device determined by the driver computing device;
transmit, via the network to the driver computing device based on the new route and the new pickup time, navigational data to direct the driver to pick up the user and to direct the driver to the destination from the location of the mobile device to fulfill the transportation request; and
provide, to the mobile device, updates of the driver location of the driver computing device.

10. The apparatus of claim 9, wherein the user is a passenger.

11. The apparatus of claim 9, wherein the processing device is further to:
communicate the pickup time to the mobile device associated with the user.

12. The apparatus of claim 9, wherein the one or more factors comprise weather conditions, wherein the changes to the one or more factors comprise changes in the weather conditions, and wherein the processing device is further to:
communicate the new pickup time to the mobile device associated with the user.

13. The apparatus of claim 9, wherein the one or more factors comprise traffic conditions, wherein the changes to the one or more factors comprise changes in the traffic conditions, and wherein the processing device is further to:
communicate the new pickup time to the mobile device associated with the user.

14. The apparatus of claim 9, wherein the processing device is further to:
determine that the location of the user has changed to a new location;
determine an updated route to the destination based on the new location; and
determine an updated pickup time based on the desired arrival time and an updated time to travel along the updated route.

15. At least one machine readable non-transitory medium storing one or more instructions which, when executed by a processing device, cause the at least one processing device to:
receive, via a network from a mobile device associated with a user, a transportation request comprising a desired arrival time for the user to arrive at a destination and a location of the mobile device determined by a global positioning system (GPS) of the mobile device;
determine a route to the destination based on the location of the mobile device and the destination;
determine a pickup time to pick up the user based on the desired arrival time, one or more factors affecting ability for the user to arrive at the destination at the desired arrival time, and a time to travel along the route;
determine, before the user is picked up, changes to the one or more factors;
determine a new route to the destination based on the location of the mobile device, the destination, and the changes to the one or more factors;
determine a new pickup time based on the desired arrival time, the changes to the one or more factors, and a new time to travel along the new route;

select a driver computing device based on the location of the mobile device, the new pickup time, and driver availability data;

receive, from the driver computing device, a driver location of the driver computing device determined by the driver computing device;

transmit, via the network to the driver computing device based on the new route and the new pickup time, navigational data to direct the driver to pick up the user and to direct the driver to the destination from the location of the mobile device to fulfill the transportation request; and provide, to the mobile device, updates of the driver location of the driver computing device.

16. The at least one machine readable non-transitory medium of claim 15, wherein the user is a passenger.

17. The at least one machine readable non-transitory medium of claim 15, wherein the processing device is further to:

communicate the pickup time to the mobile device associated with the user.

18. The at least one machine readable non-transitory medium of claim 15, wherein the one or more factors comprise weather conditions, wherein the changes to the one or more factors comprise changes in the weather conditions, and wherein the processing device is further to:

communicate the new pickup time to the mobile device associated with the user.

19. The at least one machine readable non-transitory medium of claim 15, wherein the one or more factors comprise traffic conditions, wherein the changes to the one or more factors comprise changes in the traffic conditions, and wherein the processing device is further to:

communicate the new pickup time to the mobile device associated with the user.

20. The at least one machine readable non-transitory medium of claim 15, wherein the processing device is further to:

determine that the location of the user has changed to a new location;

determine an updated route to the destination based on the new location; and determine an updated pickup time based on the desired arrival time and an updated time to travel along the updated route.

* * * * *